(No Model.)

A. C. KIMBALL.
TUBE COUPLING.

No. 384,582. Patented June 12, 1888.

WITNESSES:
Chas. H. Luther Jr.
M. F. Bligh

INVENTOR:
Andrew C. Kimball.
by Joseph A. Miller & Co.
Attys

UNITED STATES PATENT OFFICE.

ANDREW C. KIMBALL, OF PROVIDENCE, RHODE ISLAND, ASSIGNOR OF ONE-HALF TO JAMES D. ANTHONY, OF SAME PLACE.

TUBE-COUPLING.

SPECIFICATION forming part of Letters Patent No. 384,582, dated June 12, 1888.

Application filed January 9, 1888. Serial No. 260,205. (No model.)

*To all whom it may concern:*

Be it known that I, ANDREW C. KIMBALL, of Providence, in the county of Providence and State of Rhode Island, have invented certain new and useful Improvements in Tube-Couplings; and I hereby declare that the following is a full, clear, and exact description of the same, reference being had to the accompanying drawings, forming part of this specification.

This invention has reference to an improvement in couplings by which tubes can be readily connected and disconnected without decreasing the pressure or the vacuum in the tubes or pipes.

The class of couplings to which the invention is applicable is largely used on railway-cars for connecting and disconnecting the tubes or pipes for operating the air-brakes and the tubes or pipes for heating the cars, and may be used for all purposes where tubes or pipes require to be connected or disconnected.

The invention consists in the peculiar and novel construction and arrangement of the valves and packing-rings, as will be more fully set forth hereinafter.

Figure 1:
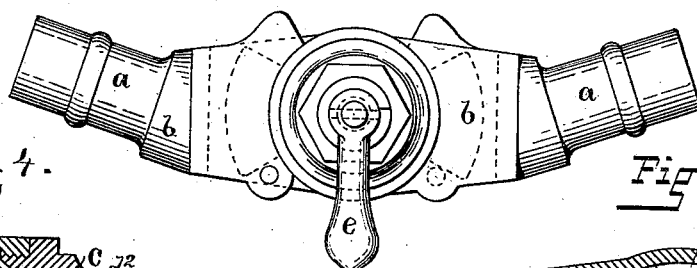
Figure 4:
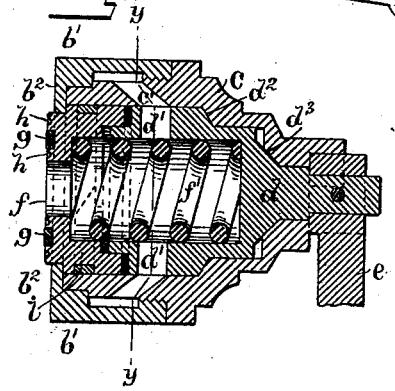
Figure 5:
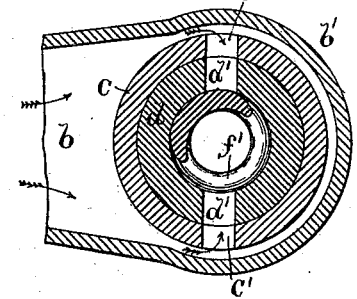
Figure 2:
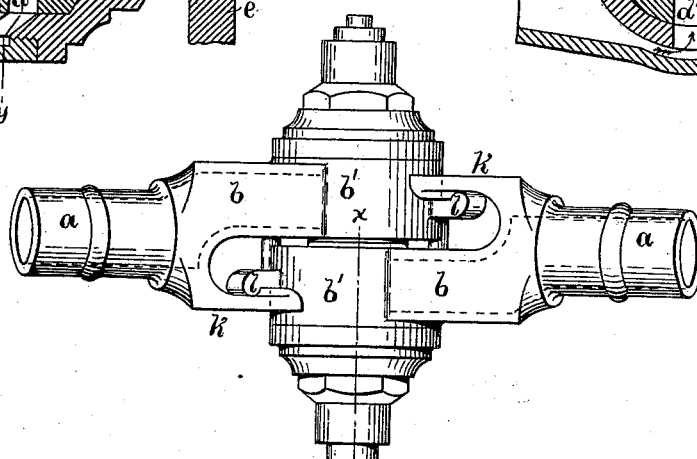
Figure 3:
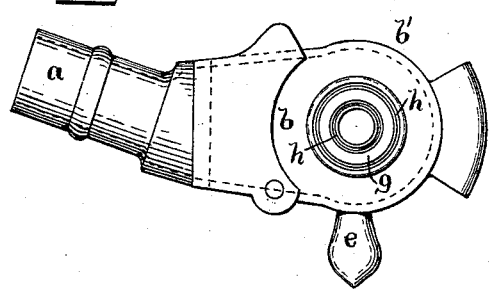

Figure 1 is an end view of the coupling, showing the valve-operating lever. Fig. 2 is a side view of the coupling. Fig. 3 is an end view of one-half of the coupling, showing the yielding packing-ring, which, with the ring on the other half, makes a tight connection between the two parts of the coupling. Fig. 4 is a sectional view through the line $x\,x$ on Fig. 2, and Fig. 5 is a sectional view through the line $y\,y$ on Fig. 4.

Similar letters of reference indicate corresponding parts throughout.

Couplings used for connecting the tubes or pipes of air-brakes or the steam-pipes of one railroad-car with another when disconnected release the pressure or the vacuum in the pipes or tubes of both cars, and when such couplings are used to connect the steam pipes or tubes of two cars the water collected in the pipes or tubes is liable to scald the person disconnecting the couplings. To avoid this difficulty, I provide each half of the coupling with a valve, both of which can be readily closed before disconnecting the coupling. The steam or air pressure or the vacuum in the pipes, tubes, or the cylinders for operating the brakes can be thus maintained or released by opening the valves when the coupling has been disconnected.

In the drawings, $a\,a$ are the tubular ends of the two parts of the coupling to which the flexible connecting-tubes are secured. Each half of the coupling being a fac-simile of the other half, the description of one-half will answer for both.

$b$ is a rectangular hollow chamber connecting the tubular end $a$ with the chamber $b'$.

$c$ is the valve-case, which is secured in the chamber $b'$, an annular space or passage being formed between the walls of the chamber $b'$ and the valve-case $c$. The valve-case is provided with the ports $c'\,c'$. Within the valve-case $c$ is placed the tubular valve $d$, provided with the ports $d'\,d'$, so that when the valve $d$ is open the ports $c'$ and $d'$ form a direct connection between the interior of the valve $d$ and the ends $a$ by means of the annular space in the chamber $b'$. The valve $d$ is provided with the beveled shoulders $d^2$ and $d^3$, which are preferably ground to fit the corresponding shoulders in the valve-case $c$, so as to make a steam and air tight joint. The stem of the valve $d$ extends through the end of the valve-case $c$, and is provided with the lever $e$, by which the valve can be turned to open or close the same.

The face-plate $b^2$ of the chamber is provided with a hole of considerably less diameter than the hole in the opposite plate in which the valve-case $c$ is secured, so as to form a shoulder for the valve-case, and also a shoulder to hold the packing-cylinder $f$, which is forced outward by the coiled spring $f'$. The face of the packing-cylinder $f$ is provided with the joint-ring $g$, made of copper or other material adapted to form a durable joint. This ring projects a little beyond the face, so as to bring only the two rings into contact with each other when the two halves of the coupling are secured together.

Two or more annular grooves, $h\,h$, are formed in the face of the packing-cylinder $f$, and the packing-cylinder is provided with the split packing-ring of the ordinary construction of packing-rings used on steam-pistons, and an elastic packing is placed between the packing-cylinder and the valve. Each half of the coupling is provided with the cams $k$ $l$ for connecting the two halves together in the usual manner.

When my improved couplings are secured to railway-cars which are coupled together in the ordinary way, the valves are open—that is to say, the valves are placed with their ports opposite the ports in the valve-cases, and an open connection is established between all the cars. When, now, one of the cars is to be disconnected, the two valves in each coupling are closed and the couplings are separated. The valves in the separated couplings may now be opened to release the air or steam and train the water from the pipes or tubes if connected with the steam heating pipes of the car. The valves may be used with the packing-cylinder $f$, or with any other arrangement for making a tight joint when the two couplings are secured together. I prefer the use of the packing-cylinder, as the same is more durable, and even when in place of the metal joint-ring $g$ an elastic surface is used the same is not so liable to wear, as the packing-cylinder can turn in its case when the couplings are being secured together and partially turned while the packing-faces are in contact.

Having thus described my invention, I claim as new and desire to secure by Letters Patent—

1. The combination, with one half of a tube-coupling provided with means for securing the same to another similar half, of the valve-case $c$, provided with the steam-ports $c'$ $c'$, the valve $d$, having the ports $d'$ and operating-handle $e$, and the packing-cylinder $f$, provided with the joint-ring $g$ and packing-ring $i$, surrounding the packing-cylinder, substantially as and for the purpose set forth.

2. In a tube-coupling, the combination, with the chamber $b$, of the valve-case $c$, having the ports $c'$ $c'$, the packing-cylinder $f$, provided with the joint-ring $g$ and packing-ring $i$, surrounding said packing-cylinder, the valve $d$, provided with the ports $d'$ $d'$ and operating-handle $e$, and the spring $f'$ for holding the packing-cylinder and valve in operative position, substantially as and for the purpose set forth.

ANDREW C. KIMBALL.

Witnesses:
J. A. MILLER, Jr.,
M. F. BLIGH.